Oct. 19, 1954 J. GREGORY 2,692,168

APPARATUS FOR MOVEMENT OF A TELEVISION CAMERA

Filed March 1, 1951 5 Sheets-Sheet 1

INVENTOR
Jon Gregory
BY
Robert S. Dunham
ATTORNEY

Oct. 19, 1954 J. GREGORY 2,692,168

APPARATUS FOR MOVEMENT OF A TELEVISION CAMERA

Filed March 1, 1951 5 Sheets-Sheet 2

INVENTOR
Jon Gregory
BY Robert S. Dunham
ATTORNEY

Oct. 19, 1954 J. GREGORY 2,692,168

APPARATUS FOR MOVEMENT OF A TELEVISION CAMERA

Filed March 1, 1951 5 Sheets-Sheet 3

INVENTOR
Jon Gregory
BY Robert S. Dunham
ATTORNEY

APPARATUS FOR MOVEMENT OF A TELEVISION CAMERA

Filed March 1, 1951

INVENTOR
Jon Gregory
BY Robert S. Dunham
ATTORNEY

APPARATUS FOR MOVEMENT OF A TELEVISION CAMERA

Filed March 1, 1951 5 Sheets-Sheet 5

INVENTOR
Jon Gregory
BY Robert S. Dunham
ATTORNEY

Patented Oct. 19, 1954

2,692,168

UNITED STATES PATENT OFFICE 2,692,168

APPARATUS FOR MOVEMENT OF A TELEVISION CAMERA

Jon Gregory, New York, N. Y.

Application March 1, 1951, Serial No. 213,341

4 Claims. (Cl. 304—17)

This invention relates to an improved means of manipulating a television camera.

Television programs including plays, variety shows and other such presentations generally are performed on theater stages or in television studios arranged in a manner similar to theater stages. Such arrangements have been adapted so that the program may be performed before an audience present in the theater or studio as well as televising the performance for reception by television receivers. Theaters are used primarily because an audience is essential as an integral part of the performance. The audience participates very often, and its reaction is used to give the motivation for the performance. Oftentimes, the audience itself is televised for further impact. It is also desirable to utilize a stage arrangement because of lighting, curtains, and drops which are employed in presenting such programs.

In televising programs the current practice is to employ at least three cameras which are spaced across the front of the stage, i. e. between the actors and the audience. One camera is disposed in about the center of the stage apron and the other cameras are placed on either side of the center camera and spaced therefrom. The three cameras are mounted on movable stands resting on the stage itself. The operators of the cameras also stand on the stage apron. At least two cameras are always focused upon the same object at different angles and the third is focused in another part of the stage, used for switching or changing scenes (sets) or further action on the object that the first two cameras cannot catch, e. g., such as a broad movement across stage, or a change of angle or a change from a close-up to a medium or long shot. The result of the above-described disposition of equipment and technical personnel on the stage, between the actors and the audience, almost completely blocks the view of the audience. In addition to obstructing the view of the audience, the cameras, arranged on mounts positioned on the stage floor, have only a limited degree of maneuverability and all are at approximately the same elevation, i. e., about four feet above the stage. Furthermore, there is no practical means of raising the three stage cameras to get overhead shots of the actors and stage setting. In order to achieve an overhead shot a fourth camera is positioned in the balcony or other location. This fourth camera is usually stationary. There is also no practical means of having a single camera follow a moving figure or figures across the stage remaining in substantially the same relation thereto throughout the movement of the figures. Furthermore, there is no way to show more than one scene, or to have a transition from one set to another with sets placed upstage and downstage or across the stage. Present practice requires that all movement by performers must be spaced or limited in relation to the positions of the cameras. In order for the cameras to get the action televised, in large movement, all three must be used at one time. Directors and performers must now spend long hours of rehearsal with the cameras, as well as on their own scripts in order that all movement may be staged so that the cameras with limited maneuverability may be arranged to catch as much of the action as is possible; many scenes and individual peformances must be changed for this reason alone; much time and effort is lost and movement is so often inhibited or cut off as to make the result stiff and unnatural.

In present usage television is not fluid and there is very little continuity of movement or natural expression, even with three or more cameras, nor is there a great variety of angles in televising. Each time the television picture is switched from one camera to another, there is a break in the continuity. An additional difficulty of present day technique is that whenever a camera is focused upon a stationary object for any length of time without movement, the image of the object becomes "burned in" on the television transmitter tube with the result that when that camera is moved again, a double image occurs.

An important object of this invention is to provide an improved means for manipulating a television camera so that an increased variety of angles or positions are available in receiving the image for televising.

An additional object is to provide an apparatus for manipulating the television camera to achieve greater variety and interest in the figures being televised.

Another object is to provide an apparatus which gives greater maneuverability to the television camera so that it may receive the image of the figures or actors at various heights, by vertical movement of the camera, and also will be enabled to move across the stage with moving figures which are being televised by horizontal movement of the camera to thereby give greater continuity of reception with a single television camera.

An additional object is to eliminate the frequent interruptions in the continuity of movement of the performance which occurs when it is necessary to shift from one camera to another as the figures move across the stage.

A further object is to achieve an arcuate movement of the camera to improve the depth perspective and to improve the variety of movement possible by figures while still remaining in the range of the receiving camera.

Another object is to provide an apparatus for achieving a variety of visual effects when the camera is focused on stationary objects by movement of the camera support vertically and horizontally, both motions being accomplished at the same or at different times.

A still further important object is to provide an apparatus for achieving the various objects set forth above which, in addition, does not occupy any floor space on the stage, thereby leaving the stage free for the sole use of the performance; and which permits the theatre audience to have a substantially unobstructed view of the stage and the performers. This last-mentioned object permits the recreation of the relationship between the actors and the audience in the theatre which has the effect of enhancing the performance of the actors and increasing the enjoyment of the audience. Furthermore, the actors are free to perform anywhere on the stage rather than being required to play to specific locations to accommodate television cameras of limited mobility.

The invention includes a movable staging to support a television camera and operator at a multiplicity of positions in an area defined by the supporting apparatus for said staging. The supporting apparatus includes at least two vertical supporting members in fixed spacial relation to each other. These vertical members may be disposed at the two sides of a stage opening, i. e., at the sides of the proscenium arch, or at opposite sides of a sound stage. A horizontally disposed member is positioned between the vertical members so that the two ends of said horizontally disposed member are adjacent the vertical members. Means are provided on the ends of the horizontally disposed member to slidably or rotatably engage means on the vertical members to permit vertical adjustment of said horizontal member. A trackway may be provided on the horizontal member to support a staging for a television camera and operator. The staging is slidably or rotatably mounted on said trackway to permit horizontal movement of said staging therealong. The horizontally disposed member and the trackway provided thereon are arcuate in the horizontal plane, the curve of the arc being of any desired shape within the limitations of the particular installation.

For a more complete description of the invention, reference is made to the drawings, which form a part of this application, wherein.

Figure 1:
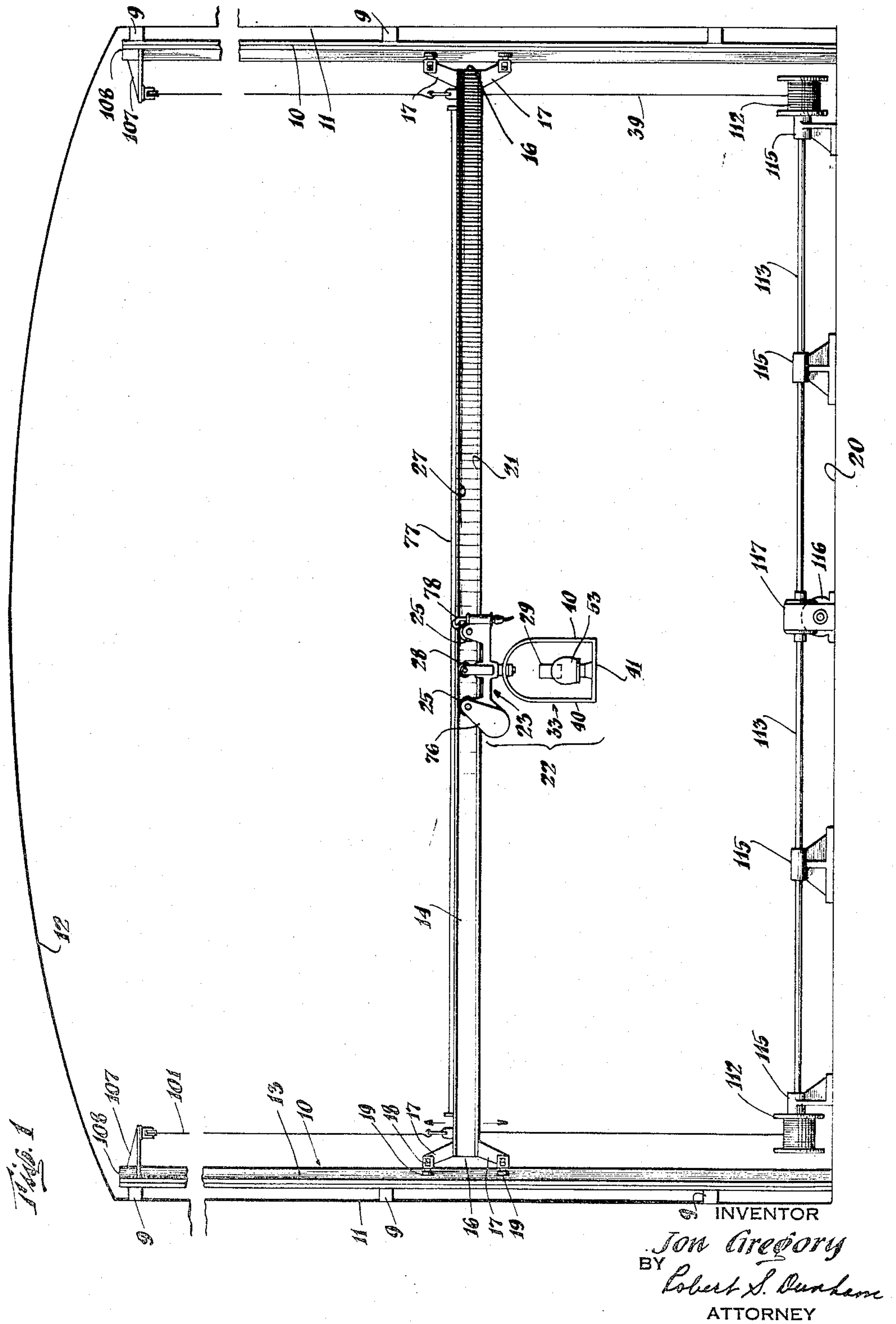
Fig. 1 is a front elevational view of apparatus embodying the invention.
Figure 2:
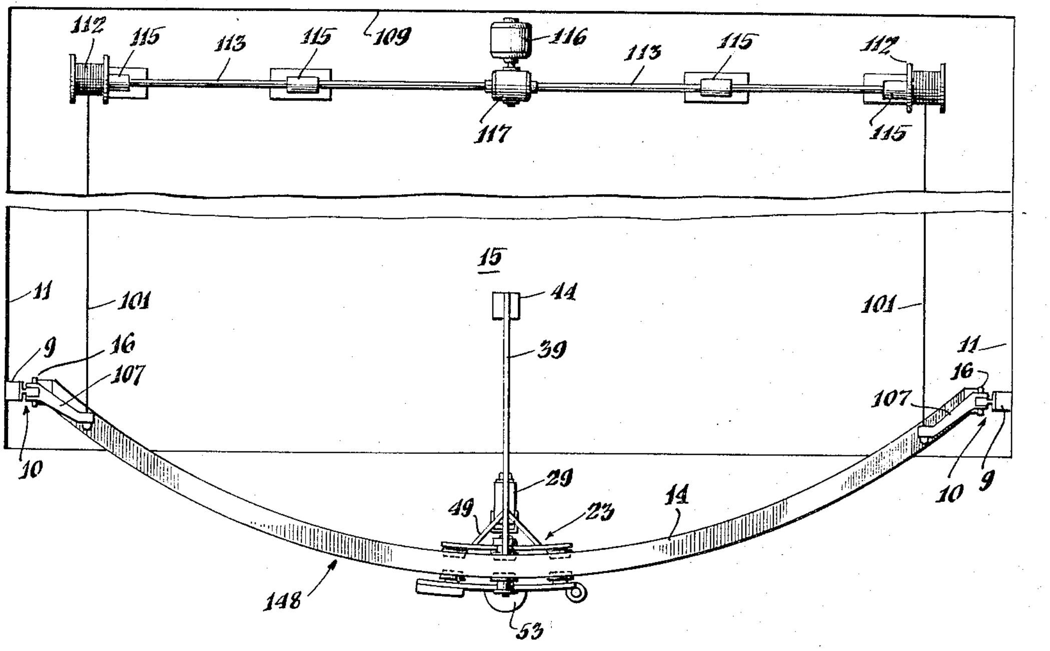
Fig. 2 is a plan view, partly foreshortened, of the apparatus.

For a general description of the invention, reference is made to Figures 1 and 2 showing the apparatus as assembled. Vertical members 10 are provided in spaced relationship to each other and as shown are adapted to be positioned adjacent to the two sides 11 of the proscenium arch 12 of a theater stage and are suitably tied into the sides 11 such as by members 9. The vertical members may be of suitable material, such as steel beams or columns of any suitable shape and each provided with means such as monorail trackways 13 on which means for slidably or rotatably engaging the trackway may be mounted.

A horizontally disposed member 14 is disposed between the spaced vertical members 10. The ends 16 of the horizontal member are disposed adjacent the members 10. Brackets 17 extend outwardly from the top and bottom of the horizontal member 14 adjacent the ends 16, and means for rotatably engaging the monorails 13 are provided at the ends of the brackets 17. In the form shown, the slidably engaging means are rotatable wheels 18 and 19. The mounting and disposition of the wheels 18 and 19 will be described in greater detail hereinafter.

A horizontal trackway 21 is provided on the horizontal member 14.

Figures 6, 7:
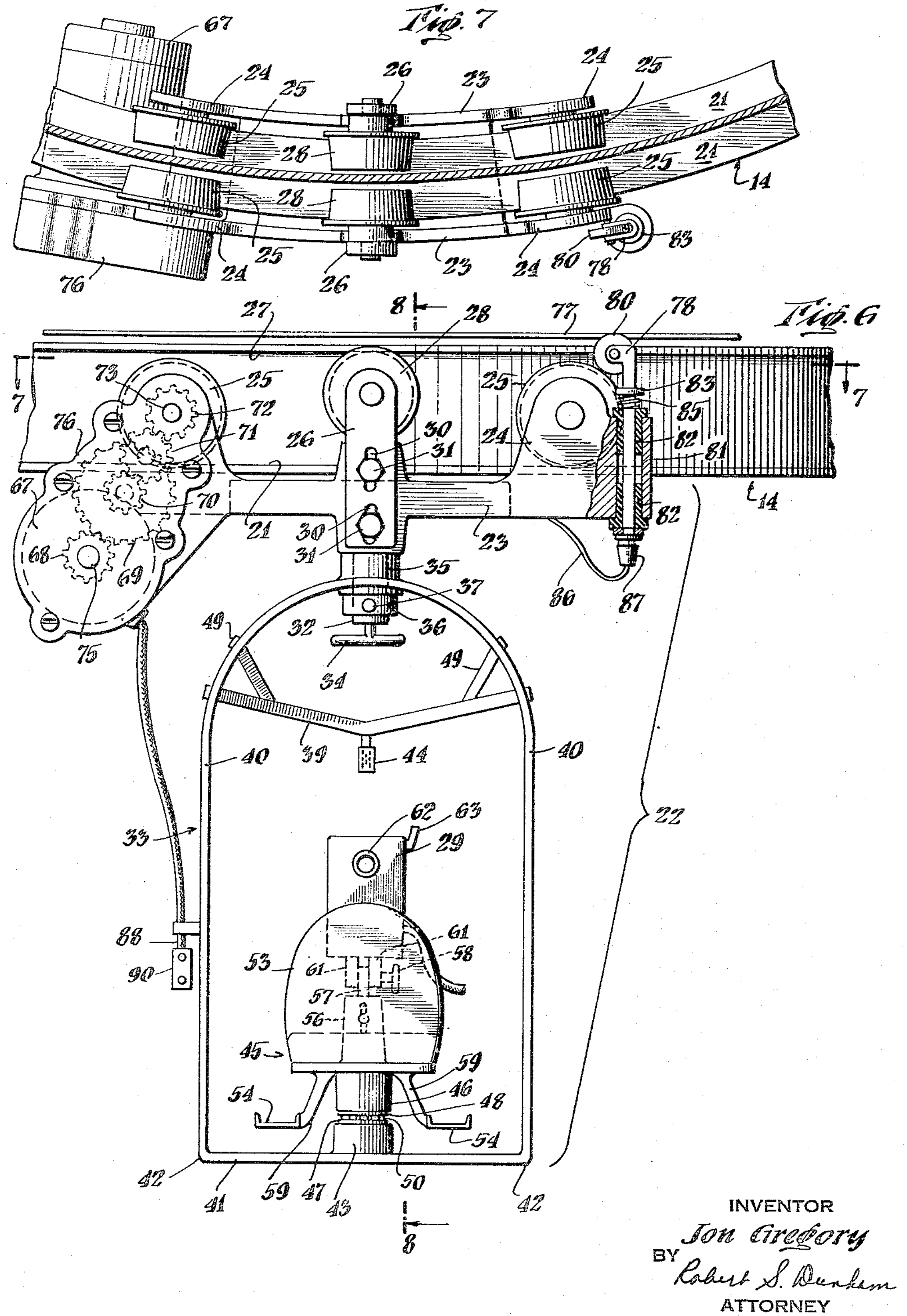
Fig. 6 is a detailed front view of the horizontally movable staging for supporting the television camera and operator.
Fig. 7 is a detailed plan view taken along the line 7—7 in Fig. 6.
Figures 8, 11, 12:
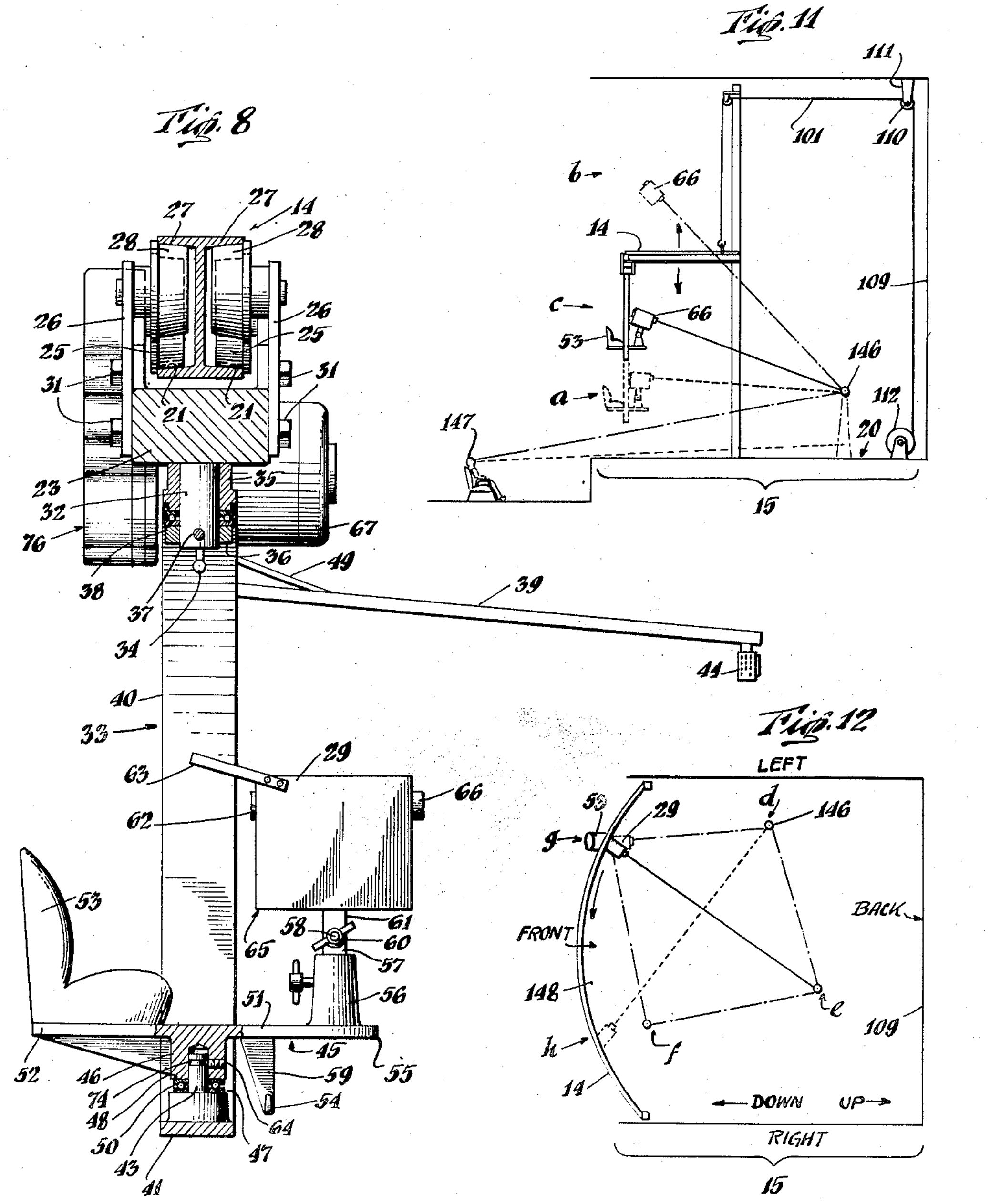
Fig. 8 is a vertical sectional view taken along the line 8—8 in Fig. 6.
Fig. 11 is a diagrammatic side view showing the relationship of the apparatus to audience and to the performers.
Fig. 12 is a diagrammatic plan view to illustrate movement of a television camera supported by the apparatus with relation to the movement of performers.

A television camera 29 and supporting staging 22 may be mounted in rolling engagement with the trackway 21 to permit horizontal arcuate movement along said trackway. Referring to Figs. 6, 7 and 8, the staging 22 includes a trolley frame 23 with bracket arms 24 extending upward at each end of the frame and on both sides of the trackway 21 as shown in Fig. 7. Flanged wheels 25 are rotatably mounted on the bracket arms and disposed to engage the trackway in the manner shown. Centrally disposed arms 26 may be provided which extend upwardly on both sides of the trackway 21 and upper trackway 27. Flanged wheels 28 may be rotatably mounted on arms 26 to engage the trackway 27. The arms 26 may be adjustably mounted on the frame 23 as best shown in Fig. 6, slots 30 being provided in each arm and the arms being attached to the frame by bolts 31 passing through said slots.

A post 32 suitably fixed to the frame 23, on the lower side thereof, extends downwardly from said frame. A stirrup-shaped member 33 having an integral collar opening 35 at its upper end of sufficient size to fit on post 32 is pivotally mounted on said post. A retaining collar 36 is affixed on the post 32 by means of pin 37 to retain the collar 35 of the supporting frame 33 on post 32. The bearing surfaces between the collar 35 and the retaining collar 36 may be provided with suitable friction reducing means. One such means are the ball bearings 38 disposed in suitable races formed in the bearing surfaces of said collars 35 and 36. By thus pivotally mounting the collar 35 of the frame 33, the latter is freely rotatable about the axis of the post 32.

The stirrup-shaped member 33 has two arms 40 curving outwardly and downwardly from the central collar opening 35. The lower ends 42 of arms 40 are connected either integrally or otherwise to a horizontal cross-member 41. A post 43 may be fixed in the center of the cross-member 41 by welding or by other suitable means to provide a rigid attachment.

A carriage 45 for supporting the television camera 29 and operator may be adapted to be mounted pivotally on the post 43. The mounting means may consist of a collar 46 fixed to the underside of the carriage 45. The collar is of sufficient size to be received on the post 43 and permit it to revolve pivotally about said post. The lower end 48 of the collar 46 abuts against shoulder 47 provided on the post 43. Ball bearings 50 in suitable races may be interposed between the lower end 48 of the collar 46 and the shoulder 47 so that the carriage 45 may be readily pivoted about the post 43. A screw 64 may be tapped through collar 46 and be received in an annular recess 74 provided in the post 43 in order to retain the carriage 45 on the post 43.

The carriage 45 consists of the horizontal member 51 which has positioned at one end 52 a bucket seat 53, or other suitable seating means, for the camera operator. The television camera 29 is mounted adjacent the end 55.

The bucket seat 53 may be mounted for slidable adjustment toward and away from the camera 29, in any suitable manner. Suitable foot rests 54 may be disposed below the carriage 45, the rests being connected to the member 51 of the carriage by brackets 59. The brackets should be sufficiently strong to permit the operator to stand on them to operate the camera at extreme angles.

A post 56 may be permanently fixed near the end 55 of the carriage member 51. The television camera 29 is provided with a sleeve 57 which is adapted to slide into the post 56 so that the camera may be pivotally mounted on the post to change the horizontal angle of the camera lens. The camera 29 is fixed to the sleeve 57 by pin 58 passed through the upper part of the sleeve and through holes 60 provided in the brackets 61 extending from the underside of the camera. The axis of the pin 58 is disposed horizontally to permit the camera 29 to be pivoted out of the horizontal plane to change the vertical angle of the camera lens. Therefore, by the described mountings the camera has complete vertical and horizontal flexibility with respect to its support, this flexibility of movement is in addition to the vertical, horizontal arcuate and pivotal movements of the support itself.

The television camera may be of a standard type, for example, being about 8" x 22" x 24" in overall dimensions. A view finder 62 is provided at the rear of the camera, through which the operator may sight and follow the action which it is desired to televise. A handle 63 extending outwardly from the upper rear end 65 of the camera may be used by the operator to turn or move the camera as desired. A lens 66 at the front of the camera through which the operator views the action to be televised and through which the image is received may be of the usual type. However, it may be desirable to employ a lens which may be readily adjusted for distance and for close-up focus to give greater flexibility in use to the apparatus embodying the invention.

The entire staging 22 may be arranged for self-propulsion in either direction along the trackways 21 and 27 on the horizontal member 14 by providing a suitable electric motor 67 mounted on the frame 23 which is arranged to drive one of the flanged wheels 25 fixed on shaft 73, the drive being effected through a reduction gear train including gears 68, 69, 70, 71 and 72. Gear 68 is suitably splined or otherwise fixed on the drive shaft 75 of the motor 67 and gear 72 is fixed on shaft 73. The gears 69, 70 and 71 are mounted on suitable shafts journalled in casing 76.

A conductor bar 77 shown in Figs. 1 and 6, may be provided above and parallel to the horizontal member 14 to carry electrical power to operate motor 67. Current is conducted to the motor 67 by suitable means such as the current collector 78 which has a rotatable contacting member 80 adapted to contact the bar 77. The current collector may be supported in the channel 81 of the frame 23, being insulated from said frame by sleeves 82 of electrically insulating material. The current collector 78 may be slidably mounted within the sleeves 82 to permit its vertical movement, a shoulder 83 being on collector 78 and a spring 85 being interposed between the shoulder 83 and the upper insulating sleeve 82 to press the rotatable conducting member 80 into resilient contact with the conducting bar 77.

An insulated lead wire 86 may be provided to connect the lower end 87 of the current collector 78 to one terminal of the motor 67. The other terminal may be grounded to the frame 23 or connected to a second conductor bar through another current collector. The motor 67 may be controlled by a standard type pendant cord control 88 having suitable control buttons 90 which are within easy reach of the operator seated in the bucket seat 53. If desired, the motor may alternatively be controlled from a central control panel.

Reference is now made to Figs. 1, 2, 3, 4 and 5 for a detailed description of one form of apparatus for raising and lowering the horizontal member 14 and the equipment supported thereby. The rotatable wheel members 18 and 19 which contact the monorails 13 on the vertical members 10 are resiliently pressed into contact with said rails by suitable means such as springs 91, associated with members 18 and springs 92 associated with wheel members 19. The wheels 18 and 19 are journalled in suitable bearing blocks 93 which are slidably mounted in slots 95. The springs 91 and 92 are disposed in the slots 95 and one end of each spring presses against the side of the respective bearing blocks 93 remote from the monorails 13. The other end of each spring abuts against the ends 96 of the respective slots 95. By the arrangement described or any other suitable arrangement, the wheels 18 are kept in contact with the front faces 97 of the monorails 13, and the wheels 19 are maintained in contact with the side faces 98 of said monorails. The resilient rolling contact of the wheels 18 absorbs any lateral movement of the horizontal member between the vertical members 10 and the resilient sliding or rolling contact of the wheels 19 with the side faces 98 of the monorails 13 counteracts the torque or twisting moment exerted on the horizontal member 14 by reason of the arcuate shape of the member and the weight carried thereon. The arrangement of the wheels 18 and 19 of the brackets 17, so that the points of contact with the respective monorails 13 of the vertical members 10 add to the efficiency of the resiliently mounted wheels 18 and 19 in giving stability to the horizontally disposed member 14 and in overcoming the twisting moment on said member.

For vertical movement of the horizontal member 14, lugs 100 may be fixed on the upper side of the horizontal member adjacent the ends 16 thereof. The lugs may be bolted to the horizontal member, or, as shown, may be welded in place. Lugs 100 are connected to suitable lifting cables 101 by hooks 103, attached to the cables 101, passed through eyes 102 provided in the lugs. The hooks 103 may be attached to the cables by any suitable means. The cables 101 are drawn upward over pulleys 105 journalled in pillow blocks 106. The pillow blocks in turn may be suitably fixed on brackets 107 fixed adjacent the upper ends 108 of the vertical members 10.

The cables 101 are thereafter passed over a second set of pulleys 110 which may be conveniently located near the rear 109 of the stage 15 as shown in Fig. 11. The pulleys 110 are journalled in suitably supported pillow blocks 111. Thereafter, the cables pass downward at the rear 109 of stage 15 to hoisting drums 112, one for each cable, as shown in Fig. 2. The drums 112 are positioned at opposite sides of the stage, being coaxially and rotatably mounted on shafts 113. The shafts 113 are supported in bearing blocks in stands 115, and extend from the hoisting drums 112 to a suitable power source, such as the electric motor 116, linked to the shafts 113 by suitable speed reducing means provided in the housing 117, the shafts being arranged so that both are actuated at the same speed and in the same direction.

In operation, therefore, the horizontal member 14 and the supporting staging 22 can be raised or lowered by rotating the shafts 113 in one direction by means of the power transmitted from the motor 116 through the transmission and reducing gears in housing 117. Standard gear means may be provided for reversing the rotation of the shafts 113. The cables 101 will be wound or unwound on the drums 112, depending on the direction of rotation of the shafts 113 causing the member 14 and its associated parts to be moved vertically by the equal simultaneously vertical movement of the ends 16 of the horizontal member. The motor may be controlled from a central control panel by the use of standard controls.

Figure 9:
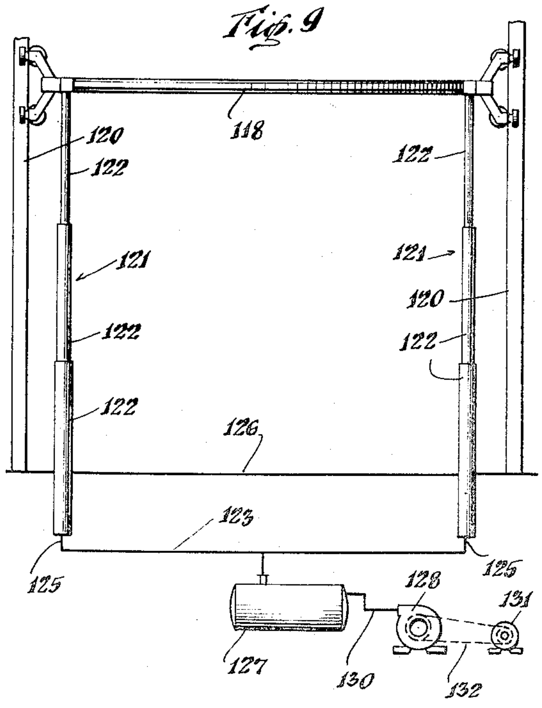
Fig. 9 is a schematic view of an alternate means of adjusting the horizontal member vertically.
Figure 10:
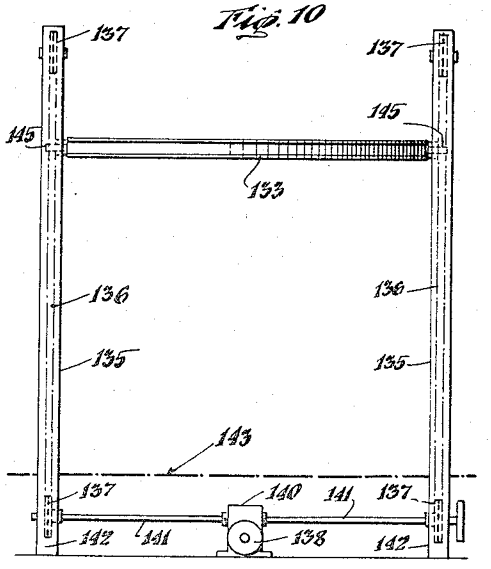
Fig. 10 is a schematic view of another alternate vertical adjusting means.
Figures 3, 4, 5:
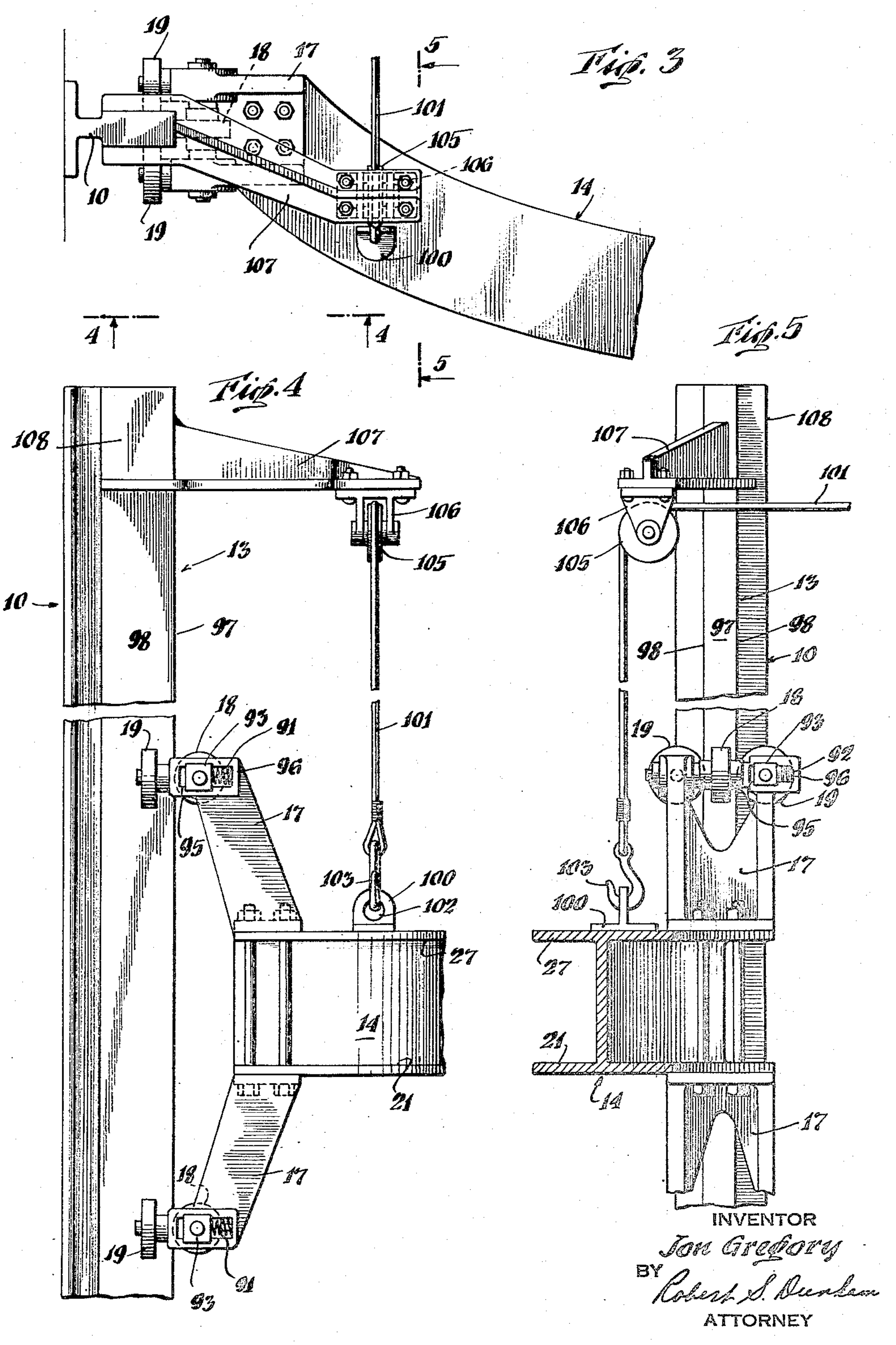
Fig. 3 is a detailed plan view of one end of the horizontal member of the apparatus showing the means for slidably engaging a vertical member.
Fig. 4 is a detailed front view, taken along the line 4—4 in Fig. 3 of the members shown in Fig. 3.
Fig. 5 is a detailed side view, with parts in section, taken along the line 5—5 of Fig. 3.

Figs. 9 and 10 are schematic arrangements of two alternative means of raising or lowering the horizontal member which carries the television staging.

In Fig. 9 the horizontal member 118 is disposed between vertical members 120 and slidably mounted to the member 120. Hydraulically-operated jacking means 121 may be used to support and move the horizontal member 118 vertically. The jacking means may be composed of telescoping sections 122 having liquid seal joints therebetween. Hydraulic fluid is passed to the jacking means by pipe 123 through the lower ends 125 of the jacking means; said lower ends may be arranged to extend below the stage floor 126. Fluid is supplied to the pipe 123 from the reservoir in which the desired hydraulic pressure is achieved or maintained by means of the pump 128 connected to the reservoir 127 by the pipe 130. The pump 128 may be operated by any suitable power source such as the motor 131 directly or through the belt 132. Suitable standard controls may be employed to operate the jacking means to raise or lower the horizontal member 118.

Another form of lifting device is shown in Fig. 10, wherein the horizontal member 133 is disposed between vertical members 135. Endless chains 136 are supported parallel and adjacent to the vertical members 135 by pulleys 137 which are journalled in brackets or other suitable supports near the upper and lower ends of the members 135. Power may be provided to the endless chains from the motor 138, through speed reducer 140, and coaxial shafts 141 to the pulleys 137 at the lower ends 142 which are below the stage floor 143. Suitable clamping means 145 fixed on the member 133 engage the chains 136.

In Fig. 11, it will be noted that with the apparatus of this invention a figure 146 on the stage readily may be televised from a position *a* in the same general level as the figure, or, from a very steep angle, such as position *b* or from any desired intermediate position such as *c* without hindering or obstructing the view of a person 147 seated in the theatre auditorium. The vast improvement of this invention over the prior devices in this respect will be appreciated when it is realized that the prior devices were mounted on the floor 20 of the stage 15, and could televise from only a single level, i. e. substantially the level indicated at *a*. The vertical movement of the camera staging makes possible new dramatic and visual effects. For example, whenever a performer goes up or down stairs the apparatus may follow the movement closely by travelling with the person and thus catch facial expressions, and thereby heighten the emotional impact, drama, suspense, or whatever the action might call for. This effect is not possible with present devices.

Another advantage of this invention is the ability of the apparatus to travel upward, to catch the patterns of large dance formations, or dramatic scenes such as operas, or mob scenes, and then to move down rapidly for closeups of individual performers. Besides the lack of flexibility of the prior devices with respect to the vertical angle of televising the object 146, the television camera and operator standing on the floor 20 of stage 15 also blocked the view of the person 147 sitting in the theatre.

Reference is now made to Fig. 12 which shows diagrammatically how the movement of the actor or figure 146 can be televised continuously during his or her movement across or up and down the stage. Assuming the action starts at *d*, that is, at the left side of the stage and progresses to *e* and thence to *f*, the camera 29 may follow the entire action throughout the movement without breaks in the continuity which are presently necessary as the figure 146 is picked up successively by each of the three cameras spaced across the front 148 of the stage 15. Alternatively, the camera 29 can be moved from left to right across the stage either ahead of or behind the figure 146 from the position *g* to the position *h*. The movement of the camera across the stage facilitates the natural movement of the performer, he is no longer inhibited by the relatively immobile cameras presently used. When more than one set is used on stage, the apparatus of this invention enables one camera to move from set to set without breaking continuity and still keep the moving figures in view. Present usage demands that separate cameras be placed before each set. The movement of the camera is effected by the operator actuating the electric motor 67, to drive the staging, along the horizontal member 14 by means of the pendant control switch 88 which is within reach of the operator seated in the bucket seat 53. Rapid movement of the camera from left to right of the stage while the figure is moving from right to left (counter or opposed movement) creates the effect of doubling the speed of the moving figure without a blur. Also, when the camera moves in the same direction as the figure, it can catch the movement, and hold it in camera range as long as necessary. This camera movement is especially advantageous in televising dance movements, races, skating, or any performance with a great deal of rapid movement.

It will be noted that the arcuate curve of the horizontal member increases the number of possible angles from which a figure or figures may be televised, and it also permits full utilization of the stage 15 up to the very front or apron 148. It will also be appreciated that during the movement of the figure from *d* to *e* and then to *f*, the horizontal trackway may be raised or lowered from *a* to *b* or *c*, so that the camera is moved vertically as well as being moved horizontally to points such as *g* and *h*, and by actuating the controls at the same time the vertical and horizontal movement can be simultaneous. The vertical movement may be under the control of the camera operator riding on the staging 22 or from a control board back stage.

The movements described are merely illustrative and it will be understood that many possible movements and relative camera positions are possible. Of particular interest, however, is the greatly enhanced depth perspective which is possible with the use of the arcuate horizontal member, for example, in a situation in which the Figure 146 is relatively stationary on the stage and the camera 29 is moved along the arcuate path defined by the member 14 and its associated trackways 21 and 27, with unbroken continuity of televising. With the apparatus of this invention the performers do not have to watch the cameras or maintain positional relationships with immobile cameras, therefore, their acting or performing is less inhibited and less stilted.

The great flexibility of movement possible with the apparatus of the present invention can be further understood when it is realized that, if desired, the portion of the theatre usually utilized as the auditorium, is converted into a sound stage, action may be televised in the auditorium with the same apparatus. The only change necessary to effect such televising in the auditorium area is for the operator to grasp the handle 34 fixed on the end of the post 32, and press one of the arms 40 to rotate the stirrup-shaped supporting member 33, 180° about the pin 32. Slight movements of the member 33 can be achieved in the same manner. Additionally, it might be noted that the means of pivoting the stirrup-member 33 about the post 32 would permit televising the audience during the progress of an operatic or theatrical performance.

The apparatus embodying the invention is also adaptable for use in television sound studios where it can be positioned midway between the ends of the studio so that action on either side of the apparatus may be received.

In order to pivot the carriage 45 with respect to the member 33, the operator, while seated in bucket seat 53, need only press against the cross member 41 with his foot. It may be desirable to provide means for releasably locking the carriage 45 with respect to the member 33, to prevent inadvertent pivoting of the carriage.

The coaxial cable for the television camera may be carried from the staging 22 to the control center by any suitable means such as by being guided along the top of member 14, or be suspended below the member 14. The cable may alternatively be permitted to run straight down to the stage and be carried across the stage.

It will be appreciated that safety railings may be placed around various portions of the staging 22 and particularly the carriage 45 for the protection of the operator against falling from the apparatus.

Suitable sound receiving apparatus may be provided on the stage 15 by means of so-called "pencil" microphones which are so thin that they are barely visible. When these are not practical or desirable, the sound receiving apparatus 44 may be mounted as best shown in Figs. 6 and 8 on a standard type boom 39, the latter being fixed to the member 33 by any suitable means such as by bolting to the bracket 49.

It will be understood that from the foregoing description, the apparatus for executing the various movements of the television camera achieves all the objects set out above.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. A movable staging to support a television camera and operator at a multiplicity of positions in an area defined by the supporting apparatus for said staging comprising at least two vertical supporting members in fixed spacial relation to each other, a horizontally disposed member positioned between the vertical members, means mounted on the ends of the horizontal member adjacent the vertical members, said means slidably engaging the vertical members for vertical movement therealong, lifting means attached to the horizontal member whereby it can be raised or lowered, a horizontal trackway fixed to the horizontal member, said horizontal member and said trackway being arcuate in the horizontal plane, a staging to support a television camera and operator, a trolley carriage supported by rotatably mounted wheels mounted on the trackway for movement horizontally therealong, and means for mounting the staging pivotally on a vertically disposed post fixed to said carriage, the staging including a vertically-disposed stirrup-shaped member having two curving arms joined at their upper ends and having their lower ends connected by a cross member, at the juncture of the upper arms of said stirrup-shaped member a collar opening sufficiently large to be pivotally mounted on the vertical post of the trolley carriage, another post fixed on the upper side of the cross member, on said last named post, a supporting carriage having a support for the television camera and another support for the operator, and a collar formed on the underside of the supporting carriage sufficiently large to be received on the post fixed to the horizontal member.

2. The apparatus of claim 1 wherein the supporting carriage is pivotally mounted on the post fixed to the cross member of the stirrup-shaped member.

3. The apparatus of claim 1 wherein horizontal hand bars are fixed on the post fixed to the trolley carriage whereby the staging may be pivoted about said post manually by the operator grasping the hand bars and one of the arms of the staging and moving the arm in the desired direction.

4. An apparatus to support a television camera and operator at a multiplicity of positions in an area defined by said supporting apparatus, comprising, at least two vertical supporting members in fixed spatial relation to each other, a rigid horizontally disposed member, means for connecting said horizontal member to the vertical members in movable engagement therewith for vertical movement, means for raising and lowering the horizontal member, a trackway on said horizontal member, a staging to support a television camera and operator, a trolley carriage mounted for movement along said trackway, and cooperating vertically disposed pivot members on said carriage and staging for pivotally and rigidly supporting the staging by said carriage, one of said pivot members being fixed to the carriage and the other being fixed to the staging, the staging including a second carriage for the camera and operator, pivotally mounted on said staging.

References Cited in the file of this patent

UNITED STATES PATENTS

| Number | Name | Date |
|---|---|---|
| 717,161 | Campbell | Dec. 30, 1902 |
| 1,422,032 | Chapman | July 4, 1922 |
| 1,642,333 | Damore | Sept. 13, 1927 |
| 1,740,117 | Pinckney | Dec. 17, 1929 |
| 2,123,529 | Goosson | July 12, 1938 |
| 2,211,088 | Arnold | Aug. 13, 1940 |
| 2,305,906 | Smith | Dec. 22, 1942 |
| 2,432,167 | Aune | July 1, 1947 |
| 2,447,667 | Raby | Aug. 24, 1948 |
| 2,538,910 | Miller | Jan. 23, 1951 |

FOREIGN PATENTS

| Number | Country | Date |
|---|---|---|
| 769,651 | France | June 11, 1934 |